US012643152B2

(12) United States Patent
Daulton et al.

(10) Patent No.: US 12,643,152 B2
(45) Date of Patent: *Jun. 2, 2026

(54) ADAPTIVE OVERHAUL WITH TWO BRAZE MATERIAL AND CT SCANS

(71) Applicant: Pratt & Whitney Canada Corp., Longueuil (CA)

(72) Inventors: Charles Trent Daulton, Burkburnett, TX (US); Kevin M. Tracy, Wichita Falls, TX (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 476 days.

This patent is subject to a terminal disclaimer.

(21) Appl. No.: 18/117,184

(22) Filed: Mar. 3, 2023

(65) Prior Publication Data
US 2024/0293868 A1     Sep. 5, 2024

(51) Int. Cl.
*B22F 10/85*        (2021.01)
*B22F 10/34*        (2021.01)
(Continued)

(52) U.S. Cl.
CPC .............. *B22F 10/85* (2021.01); *B22F 10/34* (2021.01); *B22F 10/66* (2021.01); *B22F 12/41* (2021.01);
(Continued)

(58) Field of Classification Search
None
See application file for complete search history.

(56) References Cited

U.S. PATENT DOCUMENTS 5,071,054 A     12/1991   Dzugan et al.
8,140,179 B2     3/2012   Drechsler et al.
(Continued)

FOREIGN PATENT DOCUMENTS

EP         3159080 A1     4/2017
EP         2467230 B1     9/2018
(Continued)

OTHER PUBLICATIONS

Rahito, D.A Wahab, Azman, A.H. (2019). Additive Manufacturing for Repair and Restoration in Remanufacturing: An Overview from Object Design and Systems Perspectives. Processes, vol. 7, No. 11. Nov. 3, 2019. p. 802.
(Continued)

*Primary Examiner* — Anthony M Liang
(74) *Attorney, Agent, or Firm* — Carlson, Gaskey & Olds, P.C.

(57)        ABSTRACT

A method of overhaul of a component includes comparing a component to reference data to provide additive manufacturing data. Depositing material on the component using an additive manufacturing device based upon the additive manufacturing data to provide a first object. The depositing of material includes initially depositing a first material having a relatively high melting point, and then depositing a second material which has a melting point lower than the relatively high melting point of the first material. The depositing step further including heating the first and second materials with a laser to sinter the materials to the component. Putting the component into the furnace for a heat cycle. Then determining predicted characteristics of the first object, and comparing the predicted characteristics of the first object to the reference data to provide machining data. Then machining the first object using the machining data. A system for overhauling a component is also disclosed.

11 Claims, 6 Drawing Sheets

(51) Int. Cl.

| | |
|---|---|
| *B22F 10/66* | (2021.01) |
| *B22F 12/41* | (2021.01) |
| *B22F 12/49* | (2021.01) |
| *B22F 12/58* | (2021.01) |
| *B33Y 10/00* | (2015.01) |
| *B33Y 30/00* | (2015.01) |
| *B33Y 40/20* | (2020.01) |
| *B33Y 50/02* | (2015.01) |
| *B33Y 80/00* | (2015.01) |

(52) U.S. Cl.
CPC .............. *B22F 12/49* (2021.01); *B22F 12/58* (2021.01); *B33Y 10/00* (2014.12); *B33Y 30/00* (2014.12); *B33Y 40/20* (2020.01); *B33Y 50/02* (2014.12); *B33Y 80/00* (2014.12)

(56) References Cited

U.S. PATENT DOCUMENTS

| | | | |
|---|---|---|---|
| 8,442,665 | B2 | 5/2013 | Krause |
| 8,910,361 | B2 | 12/2014 | Rickenbacher et al. |
| 9,174,312 | B2 | 11/2015 | Baughman et al. |
| 9,719,356 | B2 | 8/2017 | Hanlon |
| 9,764,517 | B2 | 9/2017 | Potter |
| 9,856,734 | B2 | 1/2018 | Salm et al. |
| 9,884,369 | B2 | 2/2018 | Lancaster-Larocque et al. |
| 9,902,024 | B2 | 2/2018 | Ernst et al. |
| 10,452,809 | B2 | 10/2019 | Huckerby |
| 10,814,439 | B2 | 10/2020 | Ozturk et al. |
| 10,955,815 | B2 | 3/2021 | Auxier et al. |
| 11,198,182 | B2 | 12/2021 | Worthing, Jr. et al. |
| 11,285,538 | B2 | 3/2022 | Shi et al. |
| 11,305,353 | B2 | 4/2022 | Geisen et al. |
| 11,334,051 | B2 | 5/2022 | Auxier et al. |
| 11,559,847 | B2 | 1/2023 | Cui et al. |
| 2002/0104973 | A1 | 8/2002 | Kerekes |
| 2003/0149498 | A1 | 8/2003 | Rebello et al. |
| 2003/0206820 | A1 | 11/2003 | Keicher et al. |
| 2007/0163115 | A1 | 7/2007 | Cheng et al. |
| 2012/0179285 | A1 | 7/2012 | Melzer-Jokisch et al. |
| 2014/0259666 | A1 | 9/2014 | Baughman et al. |
| 2016/0243644 | A1 | 8/2016 | Moneta et al. |
| 2017/0001379 | A1 | 1/2017 | Long |
| 2017/0044900 | A1 | 2/2017 | Salm et al. |
| 2017/0226860 | A1 | 8/2017 | Aschermann et al. |
| 2018/0243866 | A1 | 8/2018 | Srinivasan et al. |
| 2018/0281125 | A1 | 10/2018 | Burbaum |
| 2019/0022760 | A1 | 1/2019 | Coskun et al. |
| 2019/0193156 | A1 | 6/2019 | Yang |
| 2019/0283324 | A1 | 9/2019 | Tarumi et al. |
| 2019/0366491 | A1 | 12/2019 | Ozturk et al. |
| 2019/0381603 | A1 | 12/2019 | Lan et al. |
| 2020/0164465 | A1 | 5/2020 | Burbaum |
| 2021/0347008 | A1 | 11/2021 | Huckerby |
| 2022/0062997 | A1 | 3/2022 | Liu et al. |
| 2022/0066426 | A1 | 3/2022 | Czinger et al. |
| 2022/0072646 | A1 | 3/2022 | Sato et al. |
| 2022/0212296 | A1 | 7/2022 | Kulkarni et al. |
| 2022/0212396 | A1 | 7/2022 | Tardif et al. |
| 2022/0212397 | A1 | 7/2022 | Edy |
| 2022/0274181 | A1 | 9/2022 | Kato |
| 2023/0294221 | A1 | 9/2023 | Heinrich et al. |

FOREIGN PATENT DOCUMENTS

| | | | |
|---|---|---|---|
| EP | 3933527 | A1 | 1/2022 |
| EP | 3768453 | B1 | 6/2022 |
| EP | 4335570 | A1 | 3/2024 |
| EP | 4335574 | A1 | 3/2024 |
| JP | 2005000940 | A | 1/2005 |
| JP | 2009025119 | A | 2/2009 |
| WO | 2019177607 | A1 | 9/2019 |
| WO | 2022179205 | A1 | 9/2022 |
| WO | 2022189236 | A1 | 9/2022 |
| WO | 2022234658 | A1 | 11/2022 |

OTHER PUBLICATIONS

European Search Report for EP Application No. 24157193.4 dated May 22, 2024.
European Search Report for EP Application No. 24157197.5 dated May 22, 2024.
European Search Report for EP Application No. 24157189.2 dated Jun. 17, 2024.
European Search Report for EP Application No. 24161212.6 dated Jun. 21, 2024.
European Search Report for EP Application No. 24157196.7 dated May 31, 2024.
European Search Report for EP Application No. 24161165.6 dated Sep. 18, 2024.
European Search Report for EP Application No. 24161202.7 dated Sep. 18, 2024.
McMilon. How does structured-light 3D scanning work?. Artec 3D. Nov. 2022.

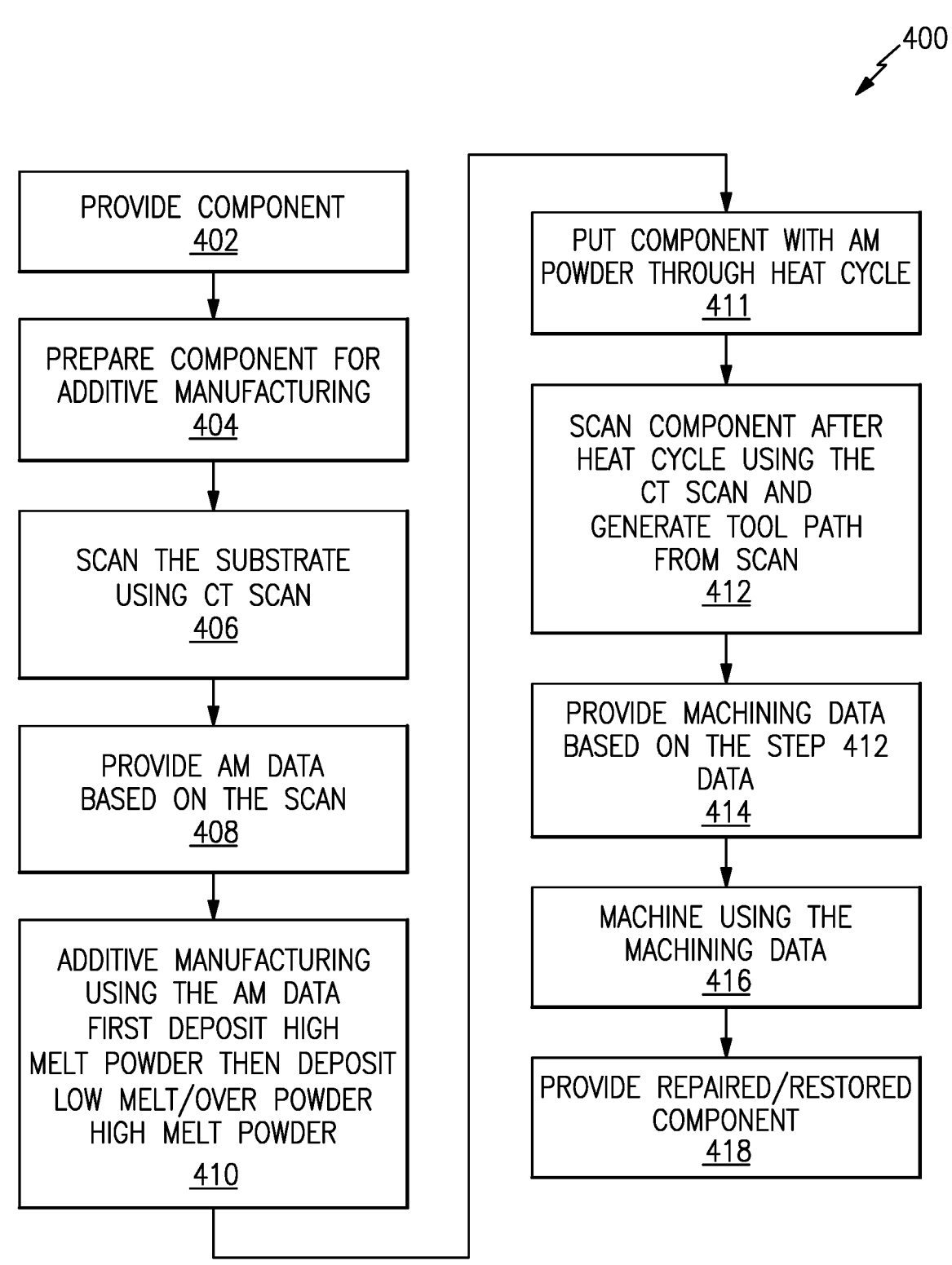

400

PROVIDE COMPONENT
402

PREPARE COMPONENT FOR
ADDITIVE MANUFACTURING
404

SCAN THE SUBSTRATE
USING CT SCAN
406

PROVIDE AM DATA
BASED ON THE SCAN
408

ADDITIVE MANUFACTURING
USING THE AM DATA
FIRST DEPOSIT HIGH
MELT POWDER THEN DEPOSIT
LOW MELT/OVER POWDER
HIGH MELT POWDER
410

PUT COMPONENT WITH AM
POWDER THROUGH HEAT CYCLE
411

SCAN COMPONENT AFTER
HEAT CYCLE USING THE
CT SCAN AND
GENERATE TOOL PATH
FROM SCAN
412

PROVIDE MACHINING DATA
BASED ON THE STEP 412
DATA
414

MACHINE USING THE
MACHINING DATA
416

PROVIDE REPAIRED/RESTORED
COMPONENT
418

FIG.4

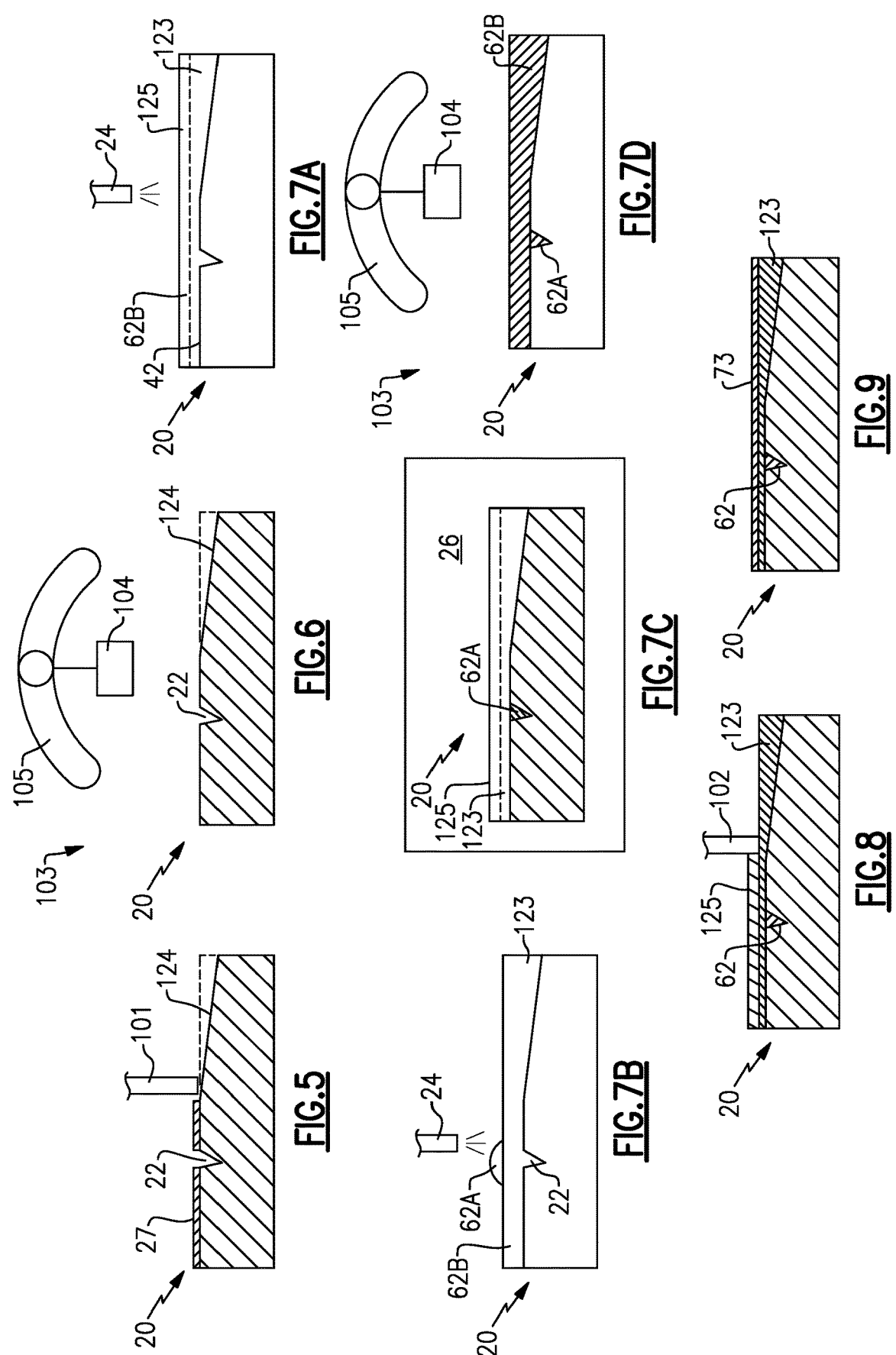

ADAPTIVE OVERHAUL WITH TWO BRAZE MATERIAL AND CT SCANS

BACKGROUND

This application relates generally to repairing a component utilizing two braze materials.

Modern systems are including more and more complex components. As the components become more complex they become more expensive. There is thus need to repair the components rather than simply replace them.

Defects in a component may be repaired using braze filler material or weld filler. Various processes are known in the art for applying such material to a component. While these known processes have various advantages, there is still room in the art for improvement.

One type of components which are frequently subject to repair are components in a gas turbine engine.

SUMMARY

A method of overhaul of a component includes comparing a component to reference data to provide additive manufacturing data. Depositing material on the component using an additive manufacturing device based upon the additive manufacturing data to provide a first object. The depositing of material includes initially depositing a first material having a relatively high melting point, and then depositing a second material which has a melting point lower than the relatively high melting point of the first material. The depositing step further including heating the first and second materials with a laser to sinter the materials to the component. Putting the component into the furnace for a heat cycle. Then determining predicted characteristics of the first object, and comparing the predicted characteristics of the first object to the reference data to provide machining data. Then machining the first object using the machining data.

These and other features will be best understood from the following drawings and specification, the following is a brief description.

BRIEF DESCRIPTION OF THE DRAWINGS

FIG. 4 is a flowchart of a method according to this disclosure.

FIG. 5 shows a component needing repair.

FIG. 6 shows a first step in the repair process.

FIG. 7A shows a subsequent step in the repair process.

FIG. 7B shows a subsequent step.

FIG. 7C shows a subsequent step.

FIG. 7D shows a subsequent step.

FIG. 8 shows subsequent machining of the FIG. 7D component.

FIG. 9 shows a final optional manufacturing step.

DETAILED DESCRIPTION

Figure 1A:
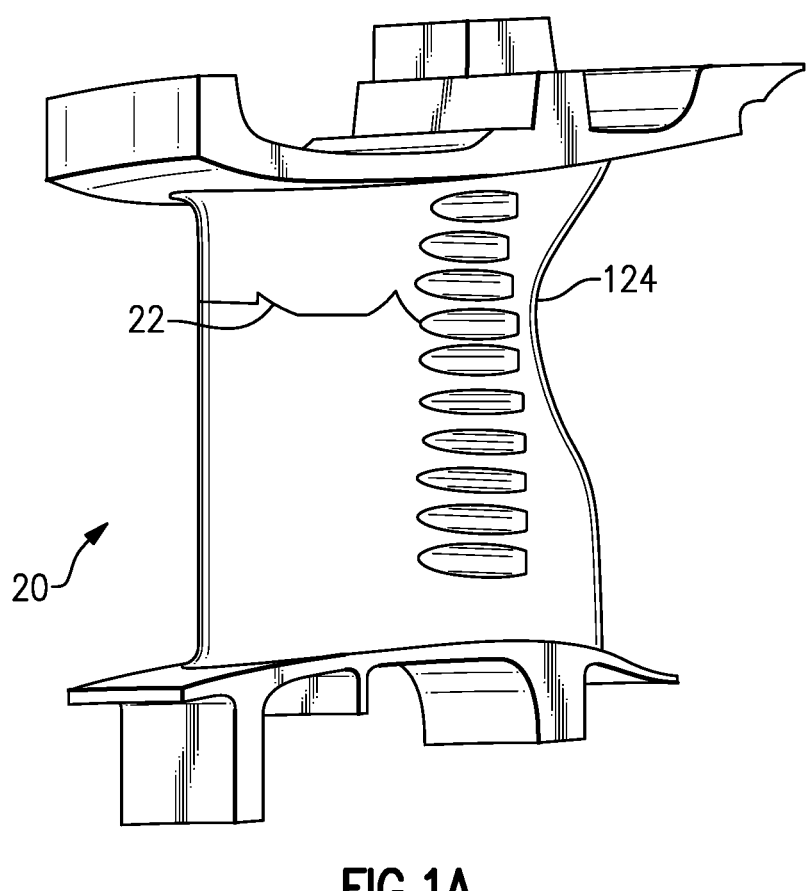
FIG. 1A shows a gas turbine engine component to be repaired.

A component 20 is illustrated in FIG. 1A as a turbine section static guide vane for a gas turbine engine. It should be understood that the teaching of this disclosure would extend to any number of other components for a gas turbine engine. As examples, blades, combustor liners, compressor section components and any number of housing components may all benefit from the teachings of this disclosure. In fact, the teachings of this disclosure extend to repairing components for applications other than gas turbine engines.

The component 20 illustrated in FIG. 1A has two areas that indicate some needed repair. It should be understood that components in a gas turbine engine are subject to extreme conditions. Thus, a defect 22, such as a crack, a divot, a pitted area, etc. may form. Collectively these are referred to here as a void. Further, it is possible for an area of wear 124 to form.

Figure 1B:
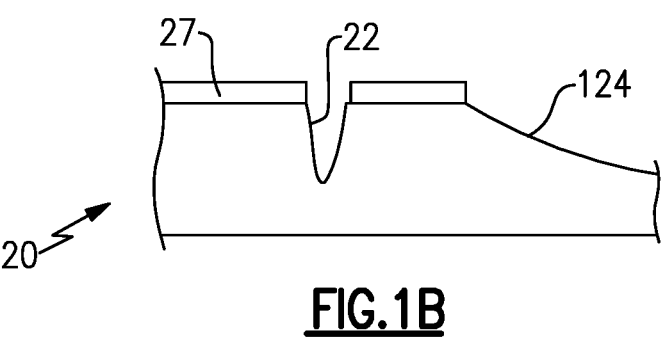
FIG. 1B shows a detail of the FIG. 1A component.

As shown in FIG. 1B, the component 20 has a coating 27 which has been partially removed both in the area of the void 22, and in the wear area 124.

Figure 2A:
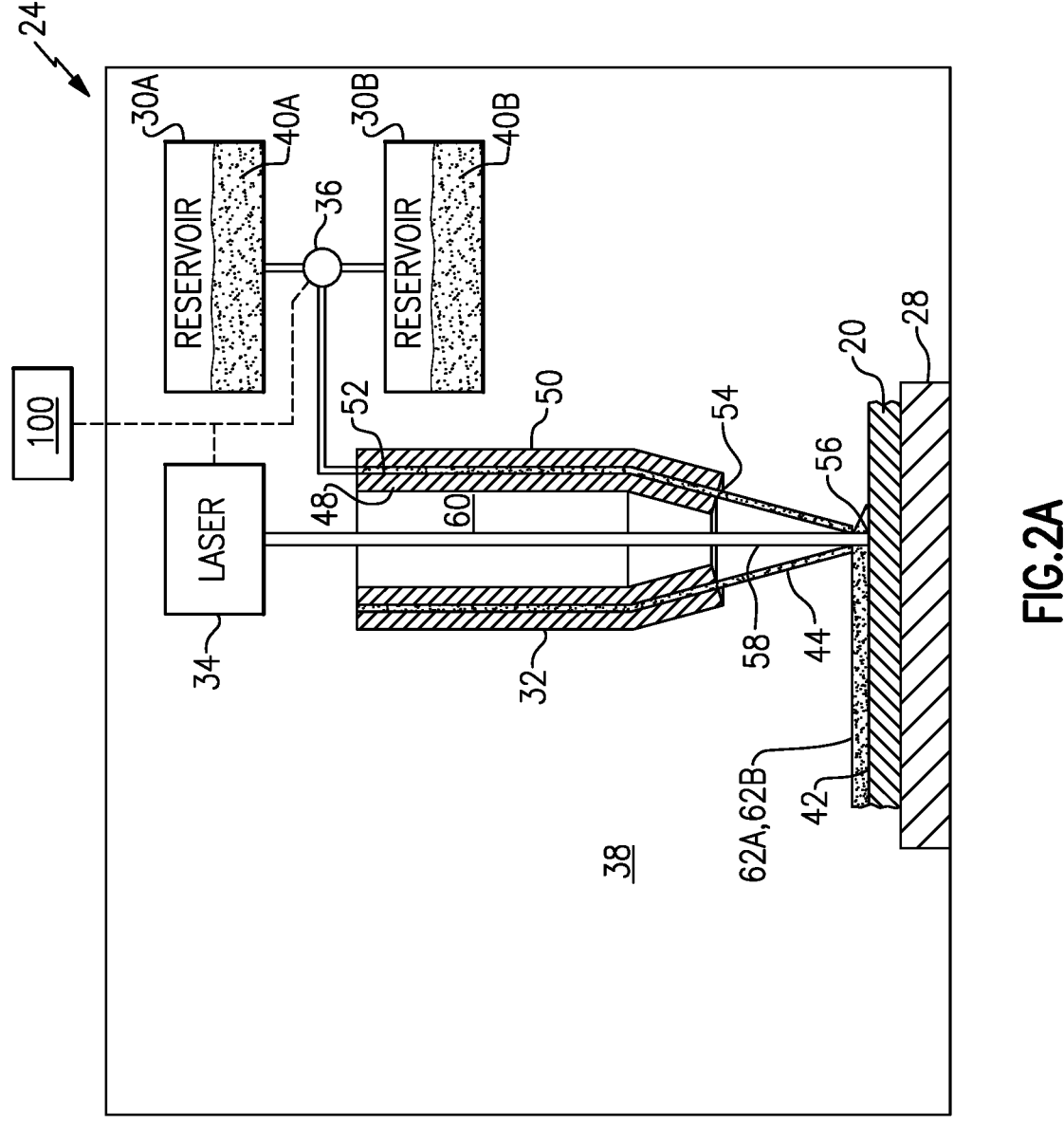
FIG. 2A shows an additive manufacturing device.
Figure 2B:
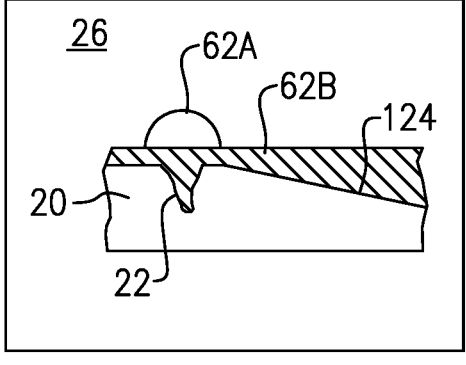
FIG. 2B shows a furnace associated with the FIG. 2A device.
Figure 2C:
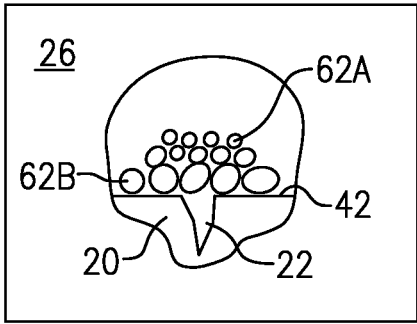
FIG. 2C shows a detail of a coated component in the furnace.

FIGS. 2A-2C disclose a system which might be utilized to repair the FIG. 1A/1B component.

Referring to FIG. 2A, the additive manufacturing device 24 may be configured as a laser material deposition device, and may be called a direct laser braze cladding machine. A component support 28 supports a component 20 to be repaired. A pair of material reservoirs 30A and 30B are provided, as is a nozzle 32, a laser 34 and a material regulation device 36, all within an internal build chamber 38. The first material reservoir 30A stores a quantity of first braze powder 40A, and second material reservoir 30B stores a quantity of second braze powder 40B, to be supplied to the nozzle 32 through the material regulation device 36 during select additive manufacturing device operations.

A control 100 is programmed to control material regulation device 36 to selectively direct the first braze powder 40A during a first mode, and selectively direct the second braze powder 40B during a second mode. The material regulation device 36 may also be controlled to selectively direct one or more combinations of the first braze powder 40A and the second braze powder 40B to the nozzle 32 during a third mode.

While the first braze powder 40A and second braze powder 40B may each include a mix of braze material and alloy material, in another feature one of the containers could contain braze material and the other could contain alloy material. The two can then be mixed to achieve the distinct relative percentages to create the low melt and high melt material as described elsewhere.

The nozzle 32 is controlled to deliver a (e.g., annular, conical) stream 44 of the braze powder toward a substrate of component 20. A tubular inner sidewall 48 and a tubular outer sidewall 50 define passage 52 (e.g., an annulus) fluidly coupled (shown schematically) to material flow regulator 36, and extends to a nozzle orifice 54. A distal end portion of the nozzle 32 and its inner sidewall 48 and its outer sidewall 50 may radially taper inwards as the nozzle 32 extends axially toward nozzle orifice 54. The nozzle 32 may focus the braze powder 40 to, around or about a target point 56 on, slightly above or slightly below the substrate surface 42. Of course nozzle 32 may be configured to deliver the braze powder 40 through an internal bore rather than an annulus. Or through any number of other known methods.

Control 100 is programmed to control laser 34 to generate a laser beam 58 for sintering the braze powder 40 delivered by the nozzle 32 to the substrate 42. Herein, the term "sintering" may describe a process for coalescing powder particles together into a solid coherent mass by heating without (e.g., partial or complete) liquification of the powder. This is in contrast to, for example, a powder laser welding process where powder is melted to a liquid state (e.g., in a melt pool) by a laser beam and then solidified as a solid mass.

Laser 34 is controlled to direct the laser beam 58 to or about the target point 56 and heats the braze powder 40 for sintering. The laser beam 58 directed through an internal bore 60 of the nozzle 32 formed by the inner sidewall 48. Of course, the laser 34 may be configured to direct the laser beam 58 outside of the nozzle 32 or along another path through the nozzle 32.

The first braze powder 40A, for example, may be deposited on the component 20 to repair a first type of substrate defect such as, but not limited to, the void 22. The second braze powder 40B, by contrast, may be deposited with the component 20 to repair a second type of substrate defect such as, but not limited to, the wear region 124 of FIG. 1A and FIG. 1B. More particularly, the first braze powder 40A may be provided (e.g., selected, formulated, etc.) for increased wettability, flowability and/or capillary penetration. The first braze powder may thereby be particularly suited for entering and filling voids. The second braze powder 40B, on the other hand, may be provided (e.g., selected, formulated, etc.) for improved dimensional repair of the surface due to lower wettability and flowability. The second braze powder may thereby be particularly suited for forming claddings. Of course, it is contemplated the first braze powder 40A and the second braze powder 40B may be mixed together in some proportion to provide a combined braze powder with intermediate braze properties.

The first braze powder 40A may include a mixture of metal alloy powder (e.g., substrate powder) and braze material powder. The metal alloy powder may be selected to have a relatively high melting point and common or similar material properties as the substrate of component 20, e.g., an aluminum (Al) superalloy, a nickel (Ni) superalloy, a titanium (Ti) superalloy, etc. The braze material powder, on the other hand, may be selected to have a relatively low melting point, which is lower than the melting point of the metal alloy powder. The braze material powder, for example, may also include a common or similar base element as the substrate and/or the metal alloy powder (e.g., aluminum (Al), nickel (Ni) or titanium (Ti)) without the super alloying elements. The braze material powder may also include boron (B), silicon (Si) and/or other melting point suppressants which may help facilitate melting and diffusion of the metal alloy powder with the substrate. The present disclosure, however, is not limited to the foregoing exemplary braze materials.

The second braze powder 40B may include a mixture of the metal alloy powder (e.g., substrate powder) and the braze material powder. A ratio of the metal alloy powder to the braze material powder in the second braze powder 40B may be greater than a ratio of the metal alloy powder to the braze material powder in the first braze powder 40A. For example, the second braze powder 40B may include higher proportions of the metal alloy powder relative to the braze material powder (e.g., 60/40). By contrast, the first braze powder 40A may include lower proportions of the metal alloy powder relative to the braze material powder (e.g., 30/70). The present disclosure, however, is not limited to the foregoing exemplary braze powder makeups. In other embodiments, one or more or all of the constituent materials in the first braze powder may be different that one or more or all of the constituent materials in the second braze powder.

During the braze powder deposition, the additive manufacturing device 24 of FIG. 2A may dispose the respective braze powder 40 onto the substrate 42 at or about the target point 56. The laser 34 may concurrently sinter this respective braze powder 40 at the target point 56 together and/or to the underlying substrate 42.

As shown, the additive manufacturing device 24 may selectively deposit the first braze powder and/or the second braze powder over the substrate such that areas which need repair, and optionally areas adjacent and/or surrounding those areas, are filled with the sintered low melt material 62A and/or coated with the sintered high melt braze material 62B. In other embodiments, the first braze powder and/or the second braze powder may be deposited over an entirety of the substrate 42 and excess material may later be removed. The braze powders may be deposited as one or more layers.

In a method according to this disclosure, the high melt braze material is initially laid down on the substrate and then the low melt braze material is put outward of the first braze material. In fact, the two materials may well have the same actual melting point. However, the low melt material would have a lower viscosity once melted relative to the high melt material.

Referring to FIG. 2B, a furnace 26 is configured to receive the component 20 with the sintered low melt material 62A and the sintered high melt braze material 62B within furnace 26. The furnace 26 subjects the component and the sintered low melt material 62A and sintered high melt braze material 62B to a heat cycle, for example under vacuum and/or in a partial pressure inert gas (e.g., argon (Ar) gas) environment. During this heat cycle, the sintered braze material(s) 62 may melt and diffusion bond to the substrate 42. An example of the furnace 26 is a vacuum furnace.

The furnace temperature is selected such that the sintered braze materials 62A and 62B melts, wets and flows into defects of the substrate by capillary action. Once the sintered braze material has melted, a relatively lower temperature may be selected and held in the same heat cycle for a duration. This sustained temperature may facilitate diffusion of the melting point suppressant material, and athermal solidification, resulting in a braze diffusion bond of the sintered material to the substrate. The diffusion duration may be between four (4) hours and twelve (12) hours. This elevated temperature, however, is less than a melting point temperature of the substrate material.

The elevated temperature for the braze melt, for example, may be between 1,500° F. and 2,500° F., and may be between 1,000° F. and 2,400° F. The inert gas environment may have a vacuum pressure range between, for example, 0.5 microns and 0.1 microns. Of course, the foregoing heat cycle parameters may vary depending upon the specific material composition of the substrate and the braze material, dimensions (e.g., thickness) of the sintered braze materials 62A and 62B, etc. The heat cycle parameters may also vary dependent on a substrate temperature as that substrate desirably must be at a temperature to create capillary action.

Thus, as shown in FIG. 2B the sintered high melt material 62B has been deposited on the substrate 42 including covering the void 22 and the worn area 124. The sintered low melt material 62A is deposited outward of the sintered high melt braze material 62B, and at an area aligned with the void 22. The high melt material 62B will fill the void 22.

The claims recite these steps in order. Thus, the first braze powder 40A is used to create the second, or low melt braze material 62A. The second braze powder 40B creates the first, or high melt braze material 62B.

FIG. 2C schematically illustrates a feature of the materials 62A and 62B. As mentioned above they have been sintered when placed. As shown in FIG. 2C, the material 62B and 62A are illustrated as small circles. This is to illustrate that it is not a continuous material, but rather is a material which has been sintered to adhere to the surfaces.

Figure 2D:
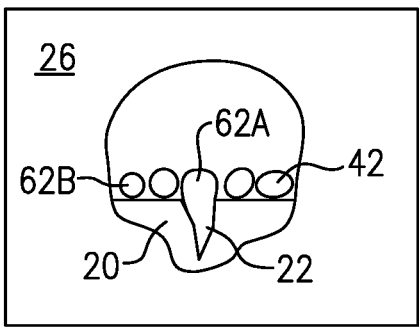
FIG. 2D shows a step subsequent to the FIG. 2C step.

FIG. 2D shows a subsequent step as the furnace begins to heat the component 20. Since the material 62A has the lower viscosity it will move around the material 62B, and fill the void 22. By depositing the materials in this order, the chance of there being pooling or undesirable flow characteristics may be reduced compared to a situation wherein the material 62A is initially deposited into the void 22 with the material 62B then placed outwardly.

In fact, there may be a mix of the two materials 62A and 62B within the void 22.

Further, while the use of the low melt material and high melt material is specifically disclosed to fill the void with the low melt material, the two could also be used just to build up a surface. There would be desirable characteristics to having the low melt material pass around the high melt material even when building up a surface.

Figure 2E:
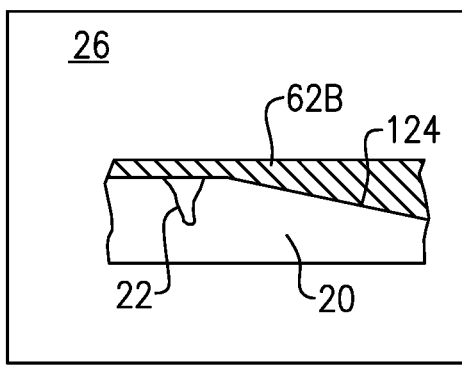
FIG. 2E shows yet another subsequent step.

As shown in FIG. 2E, after the heating has finished the materials 62A and 62B are in their respective positions filling the void 22 and providing a cladding over the substrate 42 including the worn area 124.

Following the heat cycle low melt material 62A, may partially or completely fill the void 22. The high melt material 72B may provide a cladding over the substrate 42 to restore a dimensional parameter of and/or reinforce the wear region 124 and/or other regions.

Figure 3:
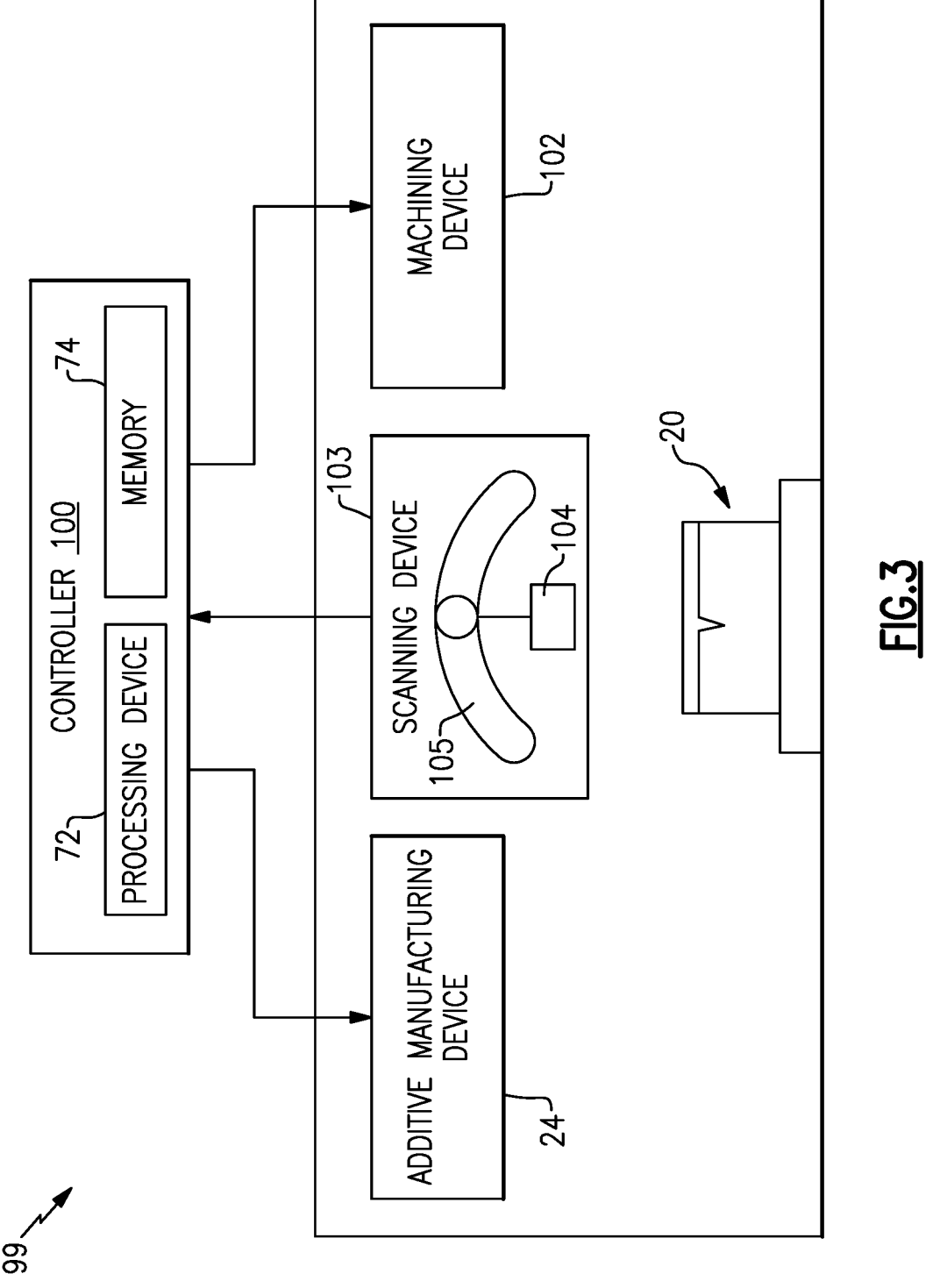
FIG. 3 shows a combined system for repairing a component.

FIG. 3 shows an overall system 99 having a controller 100 controlling the additive manufacturing device 24, and a machining device 102, as will be explained below. The component 20 may be scanned by scanning device 103, which may be a computed tomography scan (CT), as known. As known, a CT scan takes a series of x-ray images taken from different angles around component 20. Thus, an x-ray machine 104 is shown schematically with a guide 105 for allowing the x-ray machine to move to different angles relative to the component 20. Processing device 72 may operate as known to build the images. A memory 74 may be associated with historic manufacturing device for the component 20.

The component may alternatively move relative to the x-ray machine. The scanning device may be a flat-panel volumetric CT or conventional multidetector CT scanner. The flat-panel detector has wide z-axis coverage that enables imagine of entire object in one axial acquisition.

The scanning device 103 may be a structured white light scanning device with a wavelength of between 400 and 700 NM or a structured blue light scanning device with a wavelength of between 450 and 495 NM.

Distortions in the pattern of light against the exterior of the component can be identified. The scanning device 103 in conjunction with processing device 72, can map the component based upon distortions in the pattern of light.

Controller 100 may be implemented with a combination of hardware and software. The hardware may include at least the processing device 72 and the memory 74. The processing device 72 may include single-core and/or multi-core processors. The memory 74 is configured to store software or execution by the processing device. The software execution may control and/or facilitate performance of the several operations described in this application. The memory 74 may be a non-transitory computer readable medium. As an example, the memory 74 can be configured to include a volatile memory and/or a non-volatile memory.

The scanning device, in combination with a controller 100, is thus able to identify a surface geometry of the component, and to map spatial coordinates for at least a portion (or the entirety) of the component 20. Such mapping would identify dimensions and location of features such as the void 22, and the wear area 124.

The scanned data may be in the form of a computer aided design model file, such as a stereolithography model file. Controller 100 may compare the mapped substrate characteristics from the scanned data with respective characteristics from reference data. The reference data may be data input from an OEM design specification for the component 20. In other words, the controller 100 may compare the mapped characteristics from the scan of the current component 20 being worked on to corresponding characteristics of the design specification.

The controller 100 may generate a solid model of the scan data to compare to a solid model of a design space component. The controller 100 thereby evaluates the current state and condition of the component 20 and determines what additive operations need to be performed. Among the determined operations could be the amount of additive manufacturing materials to be deposited, which type, where to deposit the additive manufacturing materials, paths to follow for depositing of the additive manufacturing materials, all to put the component back to being closer to the design space.

A flowchart of a method according to this disclosure is illustrated in FIG. 4. The flowchart should be studied in combination with FIGS. 7A-7D.

As shown in FIG. 5, the component 20 to be repaired is as shown in FIG. 1B. There is a void 22 and a worn area 124. There is residual coating 27. At step 402 this component is provided for repair.

At step 404 the component is then prepared for additive manufacturing repair. Any number of steps may be performed as known to prepare the component. One such step is shown in FIG. 5 with a tool 101 removing the residual coating 27. Other preparation steps may also be taken.

Then, at step 406, the component 20 is scanned. FIG. 6 shows the scanning device 103 with x-ray machine 104 movable about the surface of the component in guide 105.

The scanned data may be aligned with reference data such as a design specification of the component or an OEM model. Because the vane may have shifted during an engine heat cycle, the individual surface of the model vanes are broken apart and aligned to the substrate model from the scan. This creates a unique geometry to correct the performance of the part without returning the part to the original casting. This unique geometry represents a desired component file. Steps may further include importing pre-braze data, reverse engineered surfacing and subsequent toolpath generation. The substrate model is essentially what the part to be repaired is now.

As step 408, the data from the scan is provided to the controller 100, and the additive manufacturing tool path is determined based upon the scan. The desired component file is what is essentially compared to the substrate file.

As shown in FIG. 7A, step 410, the material 62B is initially placed on the substrate 42. There is an area 123 which desirably remains, and extra material 125 which may be removed in a subsequent step.

As shown in FIG. 7B, the material 62A is now deposited outwardly of the material 62B.

The component 20 is then placed in the FIG. 7 furnace 26 and heating, as described above, occurs at step 411.

Then, as shown in FIG. 7D, the CT scan occurs again, and the CT scan is utilized by the controller 100 to reach a desired machining path as in step 412. In one embodiment the second scanned data could be compared to the reference data, such as information about the component as manufactured.

A tool path is determined at step 412 for removing the material 125 such that repaired component will approach its original state.

Then, at step 416 and as shown in FIG. 8, a tool 102 may remove the additional material as shown. Finally, at step 418 and FIG. 9, an outer coating 73 could be added to the repaired component 20.

Examples of the machining tools 101 and 102 may be any number of known material removable tools controlled to be movable about any number of axes.

The reference data as used with the first and second scans may be the same reference data or may include two distinct files.

The reference data used to develop the AM path and the machining path may be the same file or could include two distinct files. While specific reference sets are mentioned, other reference data sets can be used.

In a featured embodiment, a method of overhaul of a component 20 includes comparing a component to reference data to provide additive manufacturing data. Depositing material 410 on the component using an additive manufacturing device 24 based upon the additive manufacturing data to provide a first object. The depositing of material includes initially depositing a first material 62B having a relatively high melting point, and then depositing a second material 62A which has a melting point lower than the relatively high melting point of the first material. The depositing step further including heating the first and second materials with a laser 32 to sinter the materials to the component. Putting the component into the furnace 26 for a heat cycle 411. Then determining predicted characteristics of the first object, and comparing the predicted characteristics of the first object to the reference data to provide machining data. Then machining 416 the first object using the machining data.

In another embodiment according to the previous embodiment, step a) includes scanning the component.

In another embodiment according to any of the previous embodiments, the step a) scanning uses computed tomography.

In another embodiment according to any of the previous embodiments, step c) includes scanning the component again utilizing computed tomography to provide second scan data.

In another embodiment according to any of the previous embodiments, the reference data includes data from a design specification for the component.

In another embodiment according to any of the previous embodiments, the second material fills a void in the component.

In another embodiment according to any of the previous embodiments, the first material forms a cladding over a substrate of the component.

In another embodiment according to any of the previous embodiments, the first material forms a cladding over a substrate of the component.

In another embodiment according to any of the previous embodiments, further includes removing a residual coating from the component to expose a surface prior to step c).

In another embodiment according to any of the previous embodiments, the machining of step f) removes some of the material deposited during step c).

In another embodiment according to any of the previous embodiments, the component is from a gas turbine engine.

In another featured embodiment, a method of overhaul of a component including a) scanning a component using computed tomography to provide first scanned data, b) comparing the first scanned data to reference data to provide additive manufacturing data, c) depositing material on the component using an additive manufacturing device based upon the additive manufacturing data to provide a first object, the depositing of material includes initially depositing a first material having a relatively high melting point, and then depositing a second material which has a melting point lower than the relatively high melting point of the first material, with the depositing step further including heating the first and second materials with a laser 32 to sinter the materials to the component, then putting the component into a furnace for a heat cycle, d) determining predicted characteristics of the first object wherein including scanning 103/412 the first object utilizing computed tomography to provide second scan data, e) comparing the predicted characteristics of the first object to the reference data to provide machining data and f) machining 102 the first object using the machining data. The machining of step f) removes some of the material 125 deposited during step c).

In another embodiment according to any of the previous embodiments, the second material fills a void 22 in the component.

In another embodiment according to any of the previous embodiments, the first material forms a cladding 123 over a worn surface on the component.

In another embodiment according to any of the previous embodiments, the first material forms a cladding 123 over a worn surface 124 on the component.

In another embodiment according to any of the previous embodiments, the machining of step f) removes some of the material 125 deposited during step c).

In another embodiment according to any of the previous embodiments, the component is from a gas turbine engine.

In another featured embodiment, a system 99 for overhauling a component including a scanning device 103 configured to scan a component using computed tomography and provide scanned data indicative of one or more characteristics of the component. An additive manufacturing device 24 is configured to deposit material on the component to provide a first object. The additive manufacturing device is controlled by additive manufacturing data. A machining device 102 is configured to remove material from the first object based upon machining data. A controller 100 is programmed to compare a first scanned data from the scanning device with reference data to provide the additive manufacturing data. The controller is further programmed to compare a second scanned data from the scanning device with the first object to provide second scanned data. The second scanned data is utilized to develop the machining data. The controller is further programmed to initially deposit a first material 62B having a relatively high melt point onto the component, and then subsequently deposit a second material 62A having a relatively lower melting point, lower than the relatively high melting point of the first material onto the component.

In another embodiment according to any of the previous embodiments, the component is from a gas turbine engine.

In another embodiment according to any of the previous embodiments, the component is a static vane.

Although embodiments have been disclosed, a worker of skill in this art would recognize that modifications would come within the scope of this disclosure. For that reason, the following claims should be studied to determine the true scope and content.

What is claimed is:

1. A method of overhaul of a component, comprising:
   a) comparing a component to reference data to provide additive manufacturing data;
   b) depositing material on the component using an additive manufacturing device based upon the additive manufacturing data to provide a first object, the depositing of material includes initially depositing a first material having a relatively high melting point, and then depositing a second material which has a melting point lower than the relatively high melting point of the first material, with the depositing step further including heating the first and second materials with a laser to sinter the materials to the component, then putting the component into a furnace for a heat cycle;
   c) determining predicted characteristics of the first object;
   d) comparing the predicted characteristics of the first object to the reference data to provide machining data; and
   e) machining the first object using the machining data.

2. The method as set forth in claim 1, wherein step a) includes scanning the component.

3. The method as set forth in claim 2, wherein the step a) scanning uses computed tomography.

4. The method as set forth in claim 3, wherein step c) includes scanning the component again utilizing computed tomography to provide second scan data.

5. The method as set forth in claim 1, wherein the reference data comprises data from a design specification for the component.

6. The method as set forth in claim 1, wherein the second material fills a void in the component.

7. The method as set forth in claim 6, wherein the first material forms a cladding over a substrate of the component.

8. The method as set forth in claim 1, wherein the first material forms a cladding over a substrate of the component.

9. The method as set forth in claim 1, further comprising removing a residual coating from the component to expose a surface prior to step b).

10. The method as set forth in claim 1, wherein the machining of step f) removes some of the material deposited during step c).

11. The method as set forth in claim 1, wherein the component is from a gas turbine engine.

* * * * *